US007044613B2

(12) United States Patent
Debevec

(10) Patent No.: US 7,044,613 B2
(45) Date of Patent: May 16, 2006

(54) REALISTIC SCENE ILLUMINATION REPRODUCTION

(75) Inventor: Paul E. Debevec, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 772 days.

(21) Appl. No.: 10/165,359

(22) Filed: Jun. 7, 2002

(65) Prior Publication Data

US 2002/0186314 A1    Dec. 12, 2002

Related U.S. Application Data

(60) Provisional application No. 60/296,926, filed on Jun. 8, 2001.

(51) Int. Cl.
*G03B 15/02*    (2006.01)

(52) U.S. Cl. ............................................. 362/11; 362/5
(58) Field of Classification Search .................. 362/11, 362/5
See application file for complete search history.

(56) References Cited

U.S. PATENT DOCUMENTS

| 5,704,702 A | 1/1998 | Goto |
| 5,894,309 A | 4/1999 | Freeman et al. |
| 6,018,350 A | 1/2000 | Lee et al. |
| 6,078,332 A | 6/2000 | Ohazama |
| 6,313,842 B1 | 11/2001 | Tampieri |
| 6,342,887 B1 * | 1/2002 | Munroe ....................... 345/426 |
| 6,685,326 B1 * | 2/2004 | Debevec et al. .............. 362/11 |

OTHER PUBLICATIONS

Vidor, Z. An Infrared Self-Matting Process, Journal of the Society of Motion Picture and Television Engineers, Jun. 1960, pp. 425-427.
Debevec, P. Rendering synthetic objects into real scenes: Bridging traditional and image-based graphics with global illumination and high dynamic range photography. 1998. Proceedings of SIGGRAPH 98. pp. 189-198.
Debevec, P. et al. A Lighting reproduction approach to live-action compositing. 2002. ACM Transactions on Graphics. vol. 21, No. 3. pp. 547-556.
Fielding, R. The Technique of Special Effects Cinematography, "Multi-film Systems" 4th edition, Hastings House, New York, 1985, pp. 203-215.

* cited by examiner

*Primary Examiner*—David Ometz
*Assistant Examiner*—Adam L. Henderson
(74) *Attorney, Agent, or Firm*—McDermott Will & Emery

(57) ABSTRACT

An illumination reproduction apparatus and process for illuminating a subject with the illumination at a location in a scene when the subject is not in the scene. Scene illumination data is generated that specifies the illumination at the location in the scene from a plurality of spatial directions. The subject is then illuminated with the illumination at the location in the scene by driving a plurality of light sources surrounding the subject with the scene illumination data.

29 Claims, 3 Drawing Sheets

REALISTIC SCENE ILLUMINATION REPRODUCTION

CROSS REFERENCES TO RELATED APPLICATIONS

This application is related to and claims the benefit of the filing date of the following US provisional applications: HDR Shop, Application No. 60/296,926, filed Jun. 8, 2001. The contents of this provisional application are incorporated herein by reference, as well as all of the references that are cited therein.

GOVERNMENT INTEREST IN APPLICATION

This invention was made with government support under Contract No. DAAD 19-99-D-0046 awarded by the United States Government. The government may have certain rights in the invention.

BACKGROUND OF INVENTION

1. Field of the Invention

This invention relates to computer graphics and, more particularly, to compositing image elements to form a composite image.

2. Description of Related Art

Many applications of computer graphics involve compositing, the process of assembling two or more image elements to form a composite image.

An important application of compositing is to place an image of an actor over an image of a background environment. The result is that the actor, originally filmed in a studio, appears to be in the real-world location or a completely virtual environment.

For the results to appear to be real, the various elements should usually appear to have been photographed at the same time, in the same place, and with the same camera Achieving realistic composites requires matching many aspects of the foreground and background elements. The elements must be viewed from consistent perspectives, and the boundary between the two elements must match the contour of the actor, blurring appropriately when the actor moves quickly.

The two images also need to exhibit the same imaging system properties: brightness responds curves, color balance, sharpness, lens flare and noise.

Achieving the final level of realism involves matching the illumination between the foreground and the background: the elements should exhibit the same shading, highlights, indirect illumination, and shadows that they would have had if they had been in the background environment.

If an actor is composited into a cathedral, for example, his or her illumination should appear to come from the cathedral's candles, altars, and stained glass windows. If the actor is walking through a science laboratory, she should appear to be lit by fluorescent lamps, blinking readouts, and indirect lights from the walls, ceiling, and floor. In wider shots, the actor must also photometrically affect the scene: properly casting shadows and appearing in reflections.

The art and science of compositing has produced many techniques for matching these elements, but the one that remains the most challenging has been to achieve consistent and realistic illumination between the foreground and background.

The fundamental difficulty is that, when a person is actually in an environment, it is the environment that illuminates him. When a person is filmed in a studio, he is illuminated by something often quite different—typically a set of studio lights and the green or blue backing used to separate him from the background. When the lighting on the actor is different from the lighting that he would have received in a desired environment, the composite can appear as a collage of disparate elements, rather than an integrated scene from a single camera, breaking the sense of realism and the audience's suspension of disbelief.

Experienced practitioners make their best effort to arrange the on-set studio lights in a way that approximates the positions, colors, and intensities of the direct illumination in a desired background environment; however, the process is time-consuming and difficult to perform accurately. As a result, many digital composites require significant image manipulation by a compositing artist to convincingly match the appearance of the actor to his background.

Complicating this process is that, once the foreground element of an actor is shot, the extent to which a compositor can realistically alter the form of its illumination is relatively restricted. As a result of these complications, creating live-action composites is labor intensive. It also sometimes fails to meet the criteria of realism desired by the filmmakers.

SUMMARY OF INVENTION

One object of the invention is to obviate this as well as other problems in the prior art.

Another object of the invention is to produce an image of a scene containing a subject that was not photographed in the scene, but illuminated as though the subject were in the scene.

A still further object of the invention is to create a composite of a subject in a scene in a manner that faithfully replicates both the intensity and color of the illumination in the scene at the location of the subject, even though the subject is not in the scene.

These, as well as still further features, objects and benefits of the invention are obtained by an illumination reproduction process and apparatus for illuminating a subject with the illumination at a location in a scene when the subject is not in the scene.

In one embodiment, the process includes generating scene illumination data specifying the illumination at the location in the scene from a plurality of spatial directions. The subject is then illuminated with the illumination at the location in the scene by driving a plurality of light sources surrounding the subject with the scene illumination data.

In one embodiment, the scene illumination data specifies the intensity of the illumination from each of the spatial directions. Each light source has a spatial direction relative to the subject and may be driven to an intensity that is substantially proportional to the intensity of the illumination from substantially the same spatial direction in the scene.

In one embodiment, the scene illumination data also specifies the color of the illumination from each of the spatial directions. In this embodiment, the color of the light source from each spatial direction relative to the subject may be substantially the same as the color of the illumination from substantially the same spatial direction in the scene.

In one embodiment, the process further includes creating an image of the scene at the location in the scene at which the subject is to be illuminated. The subject is then photographed under the illumination of the light sources, and the photograph of the subject is then composited with the scene image at the location in the scene.

In one embodiment, the subject is photographed against a background with a camera. The background is illuminated with a non-visible or substantially monochromatic light during the photographing. The subject blocks portions of the background from the photograph. The scene image is substituted for the portions of the illuminated background that are not blocked from the camera.

In one embodiment, non-visible light in the infrared range is used.

In one embodiment, the subject includes a human face.

In one embodiment, the scene is a real scene and a light probe is used to generate the scene illumination data.

In one embodiment, the light sources are arranged in a spherical configuration.

In one embodiment, the illumination in the scene varies as a function of time, the scene illumination data specifies the illumination at various times, and the light sources are driven to illuminate the subject with the illumination in the scene at the various times.

The invention also includes an illumination apparatus for illuminating the subject with the illumination at a location in the scene when the subject is not in the scene.

In one embodiment, the apparatus includes a plurality of light sources surrounding the subject. It also includes a driver in communication with the light sources for driving the light sources with scene illumination data that specifies the illumination that the scene provides at the location in the scene from a plurality of spatial directions.

In one embodiment, the scene illumination data specifies the intensity of the illumination from each spatial direction.

In one embodiment, each of the light sources has a spatial direction relative to the subject. The driver causes the intensity of each light source to be substantially proportional to the intensity in the scene from substantially the same spatial direction.

In one embodiment, the scene illumination data also specifies the color of the illumination from each of the spatial directions.

In one embodiment, the driver causes the color of the light source from each spatial direction relative to the subject to be substantially the same as the color of the illumination from the corresponding spatial direction in the scene.

In one embodiment, each light source includes a plurality of lights with different principal wavelengths, such as at least one red, green and blue light. In one embodiment, each colored light is generated by an LED.

In one embodiment, the illumination apparatus further includes a background positioned behind the subject. Background illumination illuminates the background with light that, in one embodiment, is non-visible or monochromatic.

In one embodiment, the illumination in the scene varies as a function of time, the scene illumination data specifies the illumination at various times, and the driver causes the light sources to illuminate the subject in a manner that is similar to the illumination in the scene at the various times.

In one embodiment, the light sources are arranged in a spherical or dome-like configuration.

In one embodiment, the driver includes a processor and a data storage system for storing the scene illumination data.

The invention also includes an image compositing system for producing an image of the scene containing a subject that was not photographed in the scene, but illuminated as though the subject was in the scene. In one embodiment, an illumination apparatus is included for illuminating the subject based on scene illumination data specifying the illumination that the scene provides at the location in the scene at which the subject is to illuminated from a plurality of spatial directions. A camera photographs the subject illuminated by the scene illumination apparatus. A compositing system composites the photograph of the subject with the scene.

These as well as still further features, objects and benefits of the invention will now become apparent from a review of the following detailed description of illustrative embodiments and the accompanying drawings.

DETAILED DESCRIPTION OF ILLUSTRATIVE EMBODIMENTS

Figure 1:
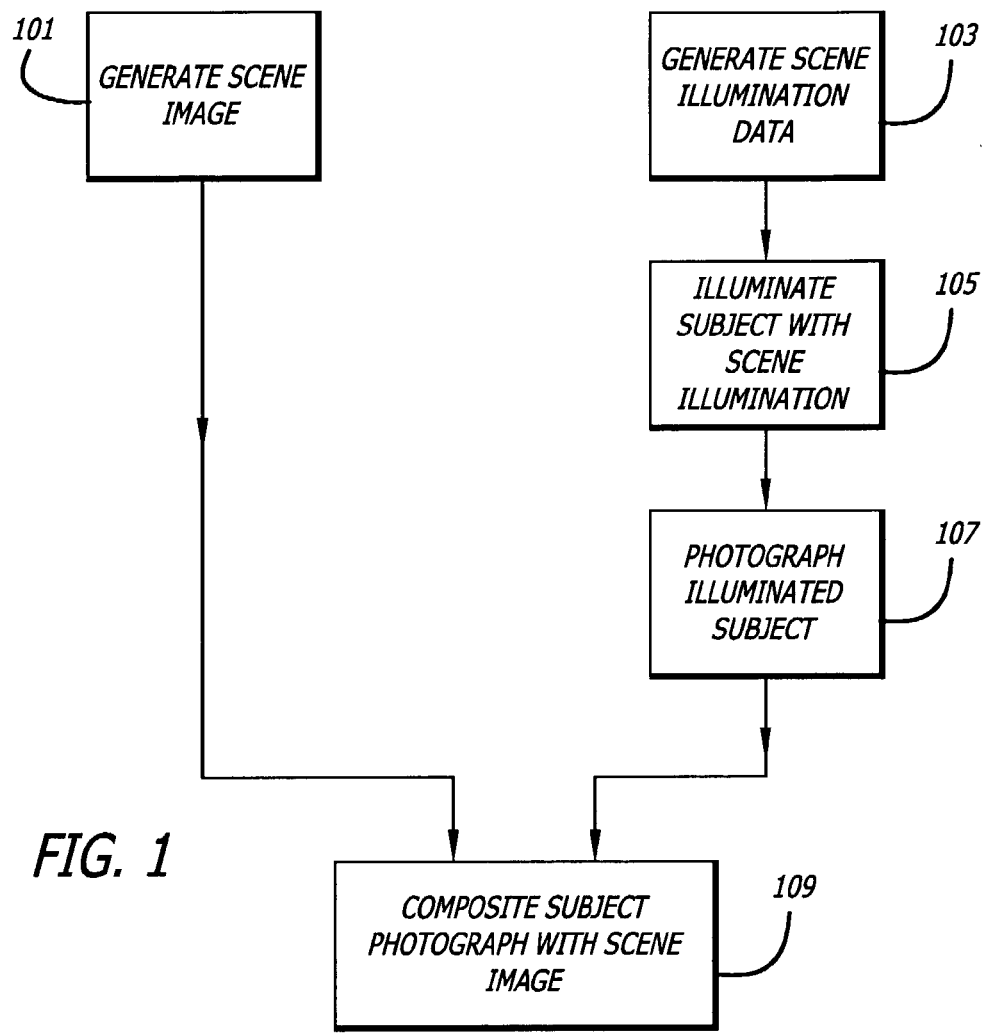
FIG. 1 is a block diagram of a compositing process in accordance with one embodiment of the invention.

FIG. 1 is a block diagram of a compositing process in accordance with one embodiment of the invention.

As shown in FIG. 1, an image of the scene in which the subject is to be composited is first generated in a Generate Scene Image step 101.

This can be as simple as photographing the scene with a film camera, movie camera or video camera. As reflected by these camera choices, the image of the scene can be static or changing. With a film or movie camera is used, the scene can be a stationary scene, objects in the scene can be moving, the camera can be moving, or both the objects and the camera can be moving.

Either before or after the Generate Scene Image step 101, data representative of the illumination in the scene at the location at which the subject is to be composited is generated in a Generate Scene Illumination Data step 103.

The goal of step 103 is to generate data that represents the illumination at the point in the scene at which the subject is to be composited. The data represents the illumination of the location from a plurality of spatial directions. Preferably, the scene illumination data includes information indicative of both the intensity and color of the illumination from each of the plurality of spatial directions, although it could represent intensity or color alone from each direction.

As with the Generate Scene Image step 101, the Generate Scene Illumination Data step 103 can generate data representative of static illumination or dynamic illumination, i.e., illumination that is changing as a function of time. The illumination might change, for example, because of changes in the illumination in the scene. Alternatively, the illumination in the scene might remain constant, but the point at which the subject is to be located in the scene might change. As should be apparent, the illumination in a static scene often changes as a function of the point in the scene.

Both the Generate Scene Image step 101 and the Generate Scene Illumination Data step 103 can generate images and data, respectively, from a real scene or, if desired, from a virtual scene, i.e., a fictitious scene that is created by an artist, typically using computer graphic techniques.

The subject is then illuminated with the illumination from the scene using the scene illumination data, as reflected by an Illuminate Subject With Scene Illumination step 105.

While the subject is being illuminated with the scene illumination, the subject is photographed in a Photograph Illuminated Subject step 107. This step captures the appearance of the subject under the illumination that simulates the illumination at the point in the scene at which the subject is to be composited.

Finally, the photographed image of the subject may then be composited in the scene at the desired location in a Composite Subject Photograph With Scene Image step 109. The composited image can be as simple as a single photograph. It can also be a film or video showing only a single image or changes in the image or the subject and/or the scene. In any case, the subject is composited at the desired location(s) in the scene under illumination as though the subject was actually in the scene.

Figure 2:
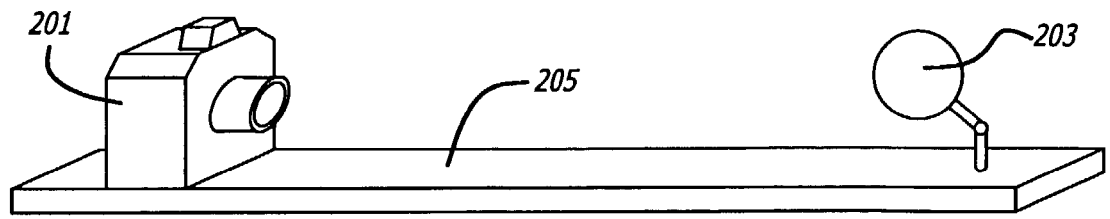
FIG. 2 is an illustration of a light probe that can be used in one embodiment of the invention to generate scene illumination data.

FIG. 2 is an illustration of a light probe that can be used in one embodiment of the invention to generate scene illumination data. This is accomplished by focusing a camera 201 on a curved reflective surface, such as a silver ball 203, both of which are affixed to a mount 205. As is well known, the metal ball 203 reflects the incident illumination from most spherical directions. An image of this reflection is then taken by the camera 201. From this, data representative of the intensity and color of incident illumination at the point of the silver ball 203 from each of a plurality of spatial directions can be extracted. Additional details about this process and structure are described in Debevec, P., "Rendering Synthetic Objects into Real Scenes; Bridging Traditional-Based Graphics with Global Illumination in High Dynamic Range Photography," Siggraph 98 (July 1998), Computer Graphics Proceedings, Annual Conference Series, pp.189–198 (July 1998, Orlando, Fla.). Addison Wesley (edited by Michael Cohen) (ISBN 0-89791-999-8), the content of which (including the references cited therein) is incorporated herein by reference.

There are, of course, several other ways to generate the scene illumination data. For example, a plurality of cameras focused in different directions could be used. A single camera could also be used to sequentially capture the illumination from several spatial directions. One or more of these cameras could also be fitted with a fish-eye lens.

As should be apparent from the discussion above, the camera 201 can be a still camera using film or an optical sensor such as a CCD, a video camera, a motion camera, or any other type of camera. During the filming, the light probe can remain stationary within a stationary scene, can remain stationary within a moving scene, can be moved within a stationary scene, or can be moved within a moving scene.

The image taken by the camera 201 can also be used in the Generate Scene Image step 101. Alternatively, a different camera can be used for this purpose. If different cameras are used for each step, however, they should usually be configured to photograph the scene (or moving scene) from the same perspective. Either they must be mounted closely together or, through optical techniques (e.g., bean splitting), made to photograph substantially the same image from substantially the same perspective.

Figure 3:
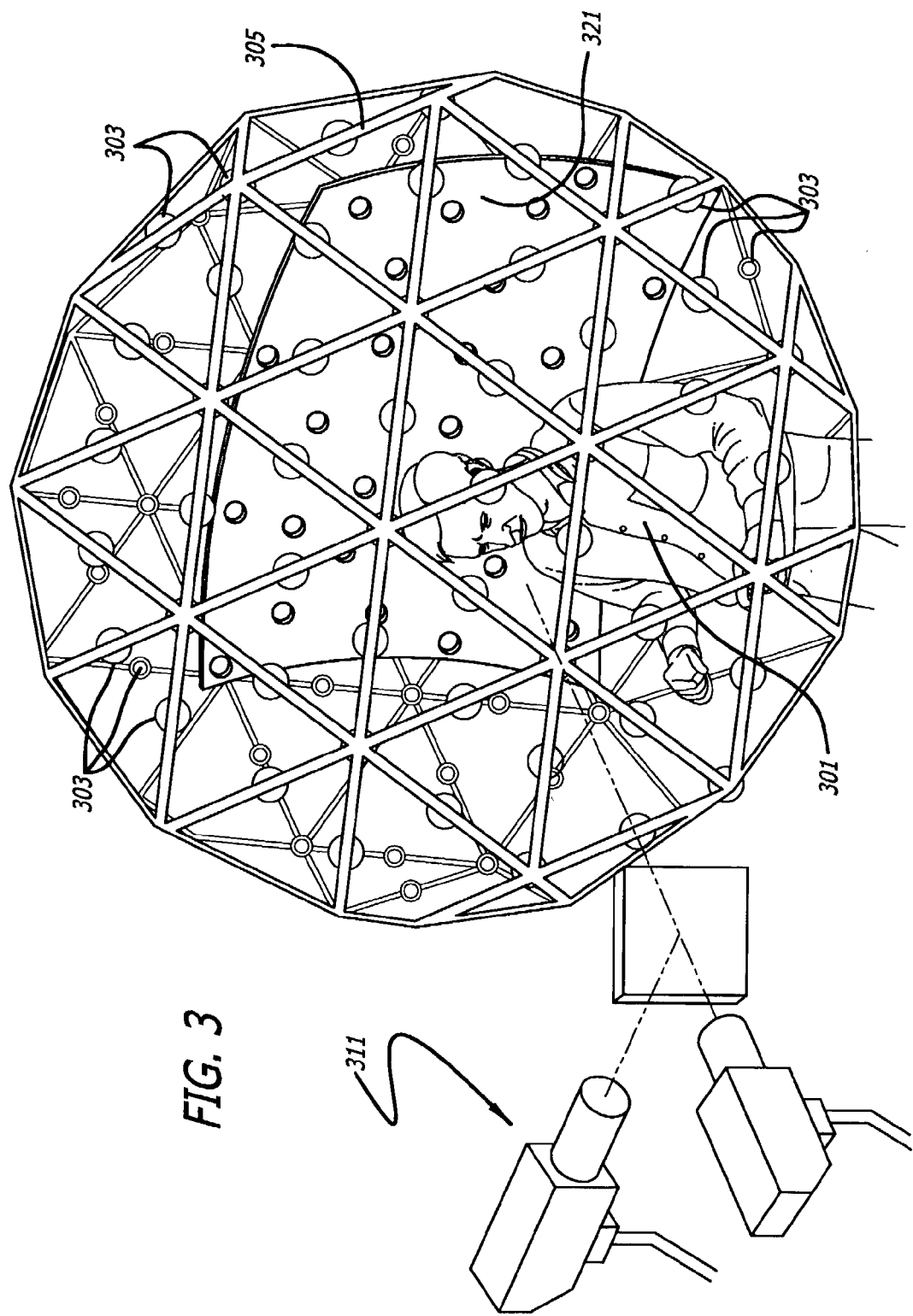
FIG. 3 is an illustration of a light stage that implements one embodiment of the invention.

As discussed above, the next step is to illuminate the subject with the scene illumination as reflected in the Illuminate Subject With Scene Illumination step 105. FIG. 3 is an illustration of a light stage that can advantageously be used in this step.

As shown in FIG. 3, a subject 301 is substantially surrounded by a plurality of light sources 303 (only a few of which are actually marked with this number, even thought a reference to all of them is intended by this numeric designation) The light sources are preferably arranged in a spherical or dome-like configuration surrounding the subject 301. In an alternate embodiment, the light sources may be affixed to walls and/or the floor and/or the ceiling.

A variety of structures can be used to support the light sources 303. This includes longitudinal cross-members, such as cross-members 305. Other techniques, including vertical supports, spheres, etc. could also advantageously be used. Preferably, the supporting structure should not significantly reflect the illumination from the light sources 303.

The separation distance between the light sources 303 and the subject 301 can vary markedly. In one embodiment, the separation distance is approximately one meter. Much larger separation distances can also be advantageous. Larger separation distances may enable more subjects to be present within the dome structure, as well as more movement of the subjects within the dome structure.

The apparatus that supports the light sources may include an opening for a camera system to photograph the illuminated subject, such as a camera system 311. In an alternate embodiment, the camera system 311 can be positioned within the apparatus.

Each of the light sources 303 should preferably have the ability to illuminate light at a controllable intensity level and color. In one embodiment, this is advantageously accomplished by using a plurality of lights for each light source, each having a color with a different principal wavelength, such as a red, blue and green light. A yellow light could also be used. Each light could be generated by an LED. Each light would be driven to the needed intensity to collectively create the needed color and intensity at that spatial position. To obtain sufficient intensity, multiple lights at each principal wavelength could be use in each lighting source 303. In one embodiment, each light source 303 is an IColor MR light manufactured by Color Kinetics. Each of these contains six LEDs of each color, generating an intensity of approximately 20 lux.

In order to simulate the illumination of the scene at which the subject is to be composited, the intensity and color of each light source 303 may be controlled and set to substantially match the intensity and color of the illumination at a location in the scene from substantially the same spatial direction in the scene. This is accomplished by driving the light sources 303 with a driver that produces driving signals based on the scene illumination data.

Figure 4:
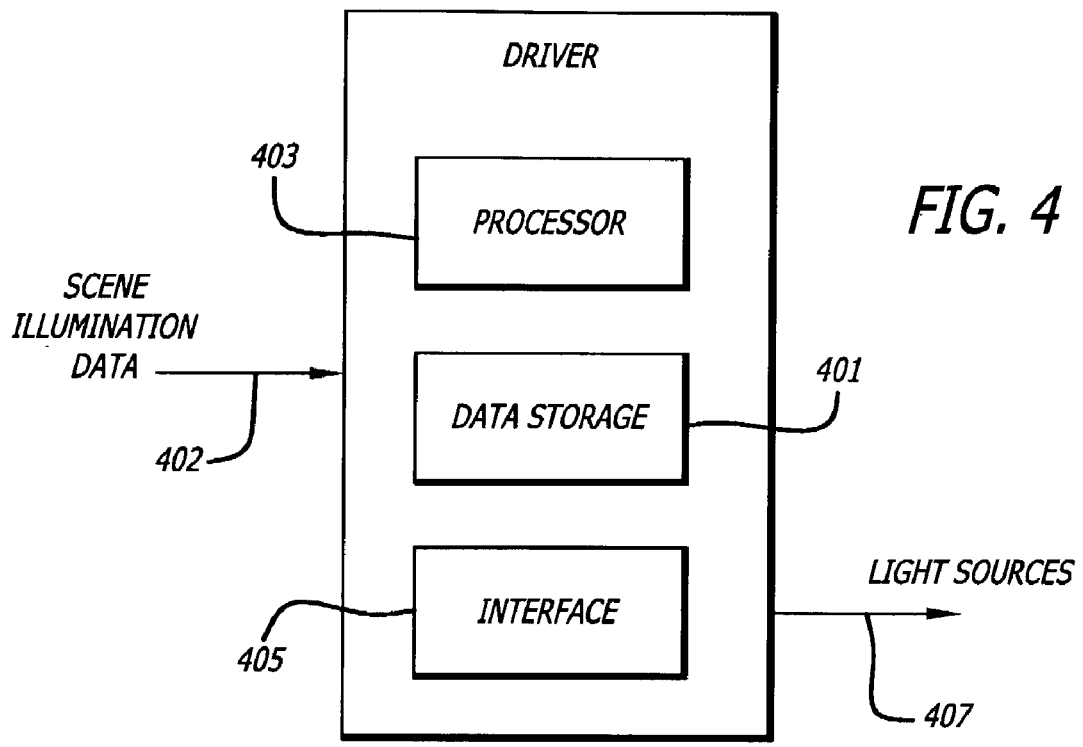
FIG. 4 is a block diagram of a driver used in one embodiment of the invention.

FIG. 4 is a block diagram of a driver used in one embodiment of the invention. As shown in FIG. 4, the driver includes a data storage system 401 for storing the scene illumination data that is delivered to the driver over an input 402. The driver also includes a processor 403 for processing the data in the data storage 401 and an interface 405 for interfacing the desired lighting signals with the light sources over an output 407.

The scene illumination data is delivered over the input 402 to the data storage 401. The data storage can be a broad variety of devices, including hard disk drives, flash memories, etc. As explained above, the scene illumination data specifies the illumination in the scene at the location at which the subject is to be composited from a plurality of spatial directions, preferably including information indicative of both intensity and color. Although being illustrated as part of the driver, it is, of course, to be understood that the data storage 401 could be separate from it.

The processor 403 cooperates with the data storage 401 and the interface 405 to generate information indicative of the needed intensity and color for each of the light sources 303. When separate red, blue and green lights are used in each light source, the processor 403 causes a signal to be delivered to the interface 405 specifying the required intensity for each of the colored lights that are needed to simulate the needed color at the needed intensity. In one embodiment, the interface 405 communicates through the light sources output 407 over a universal serial bus (USB). In this embodiment, the intensity of each LED is specified by an eight-bit (or sixteen bit) word, creating 256 (or 65,536) different intensity levels. In one embodiment, the interface 405 converts each intensity specification into a pulse-width-modulated signal, the width of each pulse being proportional to the needed intensity. The frequency of the pulse-width modulation is preferably high enough to avoid any apparent flicker.

The driver shown in FIG. 4 may typically include a general purpose computer, such as a PC, or a dedicated electronic system. In essence, a computer-based system is being used to control the intensity of each of the lights that make up each of the light source 303 in order to cause the overall illumination of the subject 301 to be substantially the same as the illumination that is present in the scene at the location at which the subject is to composited.

In one embodiment, a background 321 is positioned behind the subject 301, and the subject 301 is positioned between the camera system 311 and the background 321. Background illumination is also provided (not visible in FIG. 3) to cause the background to be illuminated.

In one embodiment, the background is illuminated with lighting in the non-visible range, such as ultraviolet or infrared lighting. (Substantially monochromatic lighting, including lighting within the visible range, could be used instead, such as yellow sodium light.) In one embodiment, six Clover Electronics infrared lights are used that produce an 850 nanometer peak wavelength. They are positioned at various points on the dome and directed toward the background 321. These infrared lights are preferably shielded to minimize the amount of light they directly cast on the camera system 311.

The camera system 311 in this embodiment preferably includes two cameras, one to photograph the subject 301 and one to photograph the background 321, blocked by the subject 301. To ensure proper matching between the images captured by both cameras, both cameras preferably photograph the same image by being mounted at right angles to a glass bean splitter. The camera that photographs the subject should not be sensitive to the non-visible (or monochromatic) light, while the camera that photographs the backing should not be sensitive to visible (or only to the monochromatic) light. In one embodiment, a Sony DXC-9000 3-color CCD camera is used to photograph the subject. This type of camera is insensitive to IR. A Uniq Vision UP-610 monochrome camera is used to photograph the background using a Hoya R 72 infrared filter to block out the visible light.

Figure 5:
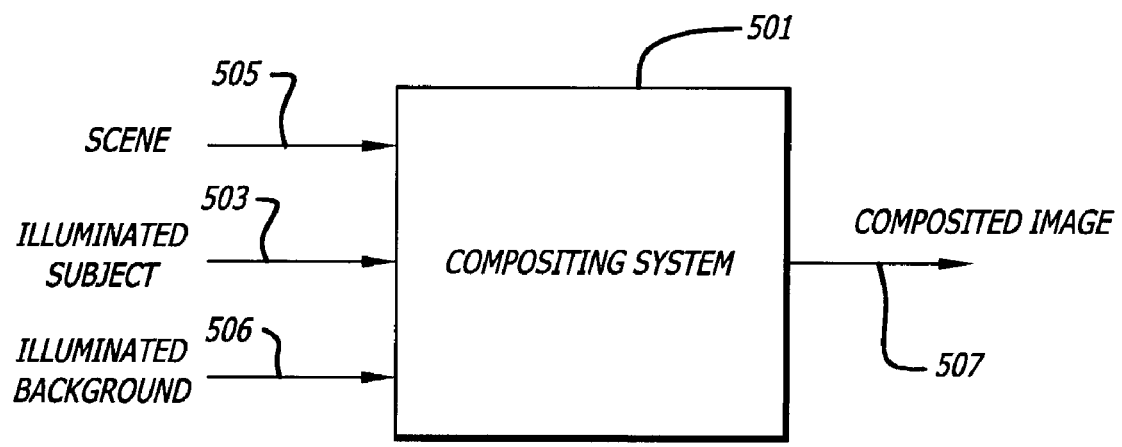
FIG. 5 is a block diagram of a compositing system that can be used in one embodiment of the invention.

FIG. 5 is a block diagram of a compositing system that can advantageously be used in one embodiment of the invention. The compositing system 501 composites the illuminated subject received by the system over an input 503 with the scene image received by the compositing system over an input 506 using well-known compositing techniques.

In one embodiment, the compositing system uses an infrared matting techniques to produce the composited image at its output 507. In essence, the compositing system substitutes the background that was not blocked from the camera system by subject received over an Illuminated Background input 505 with the scene that is present at that location using the illuminated background as a guide. Further details concerning one technique are described in Z. Vidor, "An Infrared-Matting Process," Journal of Society of Motion Picture and Television Engineers (June 1960), the content of which is incorporated herein by reference.

As should now be apparent, the composited image can be a single photograph, a motion picture or a video. Of course, when a motion picture or video is involved, the compositing process is usually done on a frame-by-frame basis.

In one embodiment, the system may be calibrated to compensate for mis-matches between the illumination on the subject and the actual illumination in the scene. Such mismatches can be caused by non-linearities in the light sources 303, the driver, the scene illumination data, spectral sensitivities in the camera, the color rendition properties of the light sources, etc. As should be apparent, compensation can be provided at various stages in the process, such as during the creation of the scene illumination data, the illumination of the subject, the photographing of the subject, the generation of the scene image, and/or during the compositing step.

The systems and the processes of the invention can advantageously be implemented with hardware, software, firmware, general purpose computers, dedicated computers, and/or with combinations of these. Although the camera systems 311 and 301 have thus-far been described as being stationary, it is of course to be understood that one or the other could also move during the photographing process to simulate movement of the subject 301 within the scene. One or more of the light sources could also be a video projector that reproduces a spatially varying incident field of illumination across the subject. Manually or computer-controlled fins could also be included with one or more light sources to similarly affect the illumination that is cast on the subject. A high-intensity white light could also be affixed to the dome at a needed location to help simulate the presence of a sun in the scene, thereby providing greater accuracy and dynamic range.

Although the scene illumination data has thus far been described as being used for illuminating the subject through the light sources, it is, of course, to be understood that the scene illumination data could be modified either before or after it is stored to effectuate a variety of effects, such as to cause fill light to be cast on the face of a subject.

Although the compositing process has thus far been described as being done after the subject has been photographed, it is, of course, to be understood that it could be done in real time, while the subject is being photographed. It also could be done in real time while the scene is being photographed.

In short, although certain embodiments of the invention have now been described, it is be understood that the invention is equally applicable to a vast array of additional and different embodiments and is limited solely to the claims that now follow and their equivalents.

I claim:

1. An illumination reproduction process for illuminating a real subject with the illumination at a location in a scene when the real subject is not in the scene comprising:
    a) generating scene illumination data specifying the illumination at the location in the scene from a plurality of spatial directions; and
    b) illuminating the real subject with the illumination at the location in the scene by driving a plurality of real light sources surrounding the real subject with the scene illumination data.

2. The illumination reproduction process of claim 1 wherein the scene illumination data specifies the intensity of the illumination from each of the spatial directions.

3. The illumination reproduction process of claim 2 wherein each of the light sources has a spatial direction relative to the subject and is driven to an intensity that is substantially proportional to the intensity of the illumination from substantially the same spatial direction in the scene.

4. The illumination reproduction process of claim 3 wherein the scene illumination data also specifies the color of the illumination from each of the spatial directions.

5. The illumination reproduction process of claim 4 wherein the color of the light source from each spatial direction relative to the subject is substantially the same as the color of the illumination from substantially the same spatial direction in the scene.

6. The illumination reproduction process of claim 1 further comprising:
   a) creating a scene image comprising an image of the scene at the location in the scene at which the subject is to be illuminated;
   b) photographing the subject under the illumination of the light sources;
   c) compositing the photograph of the subject with the scene image at the location in the scene.

7. The illumination reproduction process of claim 6 wherein:
   a) the subject is photographed against a background with a camera;
   b) the background is illuminated with a non visible light during said photographing;
   c) portions of the background are blocked from the photograph by the subject; and
   d) the scene image is substituted for the portions of the illuminated background that are not blocked from the camera.

8. The illumination reproduction process of claim 7 wherein the non-visible light is in the infrared range.

9. The illumination reproduction process of claim 1 wherein the subject includes a human face.

10. The illumination reproduction process of claim 1 wherein the scene is a real scene and wherein a light probe is used in said generating scene illumination data.

11. The illumination reproduction process of claim 1 wherein the illumination in the scene varies as a function of time, wherein said generating scene illumination data specifies the illumination at various times, and wherein said driving causes the light sources to illuminate the subject with the illumination in the scene at the various times.

12. The illumination reproduction process of claim 1 wherein the light sources are arranged in a spherical or dome-like configuration.

13. An illumination reproduction process for illuminating a real subject with the illumination at a location in a scene when the real subject is not in the scene comprising illuminating the real subject with the illumination at the location in the scene by a plurality of real light sources surrounding the real subject being driven with scene illumination data specifying the illumination at the location in the scene from a plurality of spatial directions.

14. An illumination apparatus for illuminating a subject with the illumination at a location in a scene when the subject is not in the scene comprising:
   a) a plurality of light sources surrounding the subject;
   b) a driver in communication with said light sources for driving said light sources with scene illumination data specifying the illumination that the scene provides at the location in the scene from a plurality of spatial directions.

15. The illumination apparatus of claim 14 wherein the scene illumination data specifies the intensity of the illumination from each of the spatial directions.

16. The illumination apparatus of claim 15 wherein:
   a) each of said light sources has a spatial direction relative to the subject; and
   b) said driver causes the intensity of each of said light sources to be substantially proportional to the intensity of the illumination in the scene from substantially the same spatial direction.

17. The illumination apparatus of claim 16 wherein the scene illumination data also specifies the color of the illumination from each of the spatial directions.

18. The illumination apparatus of claim 16 wherein said driver causes the color of the light source from each spatial direction relative to the subject to be substantially the same as the color of the illumination from substantially the same spatial direction in the scene.

19. The illumination apparatus of claim 18 wherein each of said light sources includes a plurality of lights, each with a different principal color.

20. The illumination apparatus of claim 19 wherein each of said light sources includes LEDs.

21. The illumination apparatus of claim 19 wherein each of said light sources includes a plurality of lights of each different principal color.

22. The illumination apparatus of claim 21 wherein said light sources includes LEDs.

23. The illumination apparatus of claim 14 further including:
   a) a background positioned behind the subject; and
   b) background illumination for illuminating the background with non-visible light.

24. The illumination apparatus of claim 23 wherein said background illumination emits illumination in the infrared range.

25. The illumination apparatus of claim 14 wherein the subject includes a human face.

26. The illumination apparatus of claim 14 wherein the illumination in the scene varies as a function of time, wherein the scene illumination data specifies the illumination at various times, and wherein said driver causes the light sources to illuminate the subject in a manner that is similar to the lighting in the scene at the various times.

27. The illumination apparatus of claim 14 wherein said light sources are arranged in a spherical or dome-like configuration.

28. The illumination apparatus of claim 14 wherein said driver includes a processor and a data storage system for storing the scene illumination data.

29. An image compositing system for producing an image of a scene containing a subject that was not photographed in the scene, but illuminated as though the subject was in the scene, comprising:
   a) an illumination apparatus for illuminating the subject based on scene illumination data specifying the illumination that the scene provides at a location in the scene at which the subject is to be illuminated from a plurality of spatial directions;
   b) a camera for photographing the subject while illuminated by said illumination apparatus; and
   c) a compositing system for compositing the photograph of the subject from said camera in the scene.

* * * * *